United States Patent [19]

Bey

[11] Patent Number: 4,479,510
[45] Date of Patent: Oct. 30, 1984

[54] ATTENUATING ROTATING VALVE HAVING VARYING CONFIGURATIONS

[76] Inventor: Roger Bey, 19, Rue des Rossignols, 68110 Illzach, France

[21] Appl. No.: 196,275

[22] Filed: Oct. 14, 1980

Related U.S. Application Data

[63] Continuation-in-part of Ser. No. 103,182, Dec. 11, 1979.

[30] Foreign Application Priority Data

Jan. 10, 1979 [FI] Finland ................................. 790084
Jul. 1, 1980 [FI] Finland ................................. 802109

[51] Int. Cl.³ ............................................. F16K 47/04
[52] U.S. Cl. .............................. 137/625.31; 251/127; 251/121; 137/625.32
[58] Field of Search ....................... 251/127, 118, 305; 137/625.28, 614.11, 614.18, 625.3, 625.31, 625.32

[56] References Cited

U.S. PATENT DOCUMENTS

| | | | |
|---|---|---|---|
| 1,615,564 | 1/1927 | Beery | 137/614.11 X |
| 2,328,736 | 9/1943 | Mock | 251/305 X |
| 3,665,965 | 5/1972 | Baumann | 251/127 X |
| 3,960,177 | 6/1976 | Baumann | 251/305 X |
| 4,037,818 | 7/1977 | Soderberg et al. | |
| 4,295,632 | 10/1981 | Engelke | 251/127 |

FOREIGN PATENT DOCUMENTS

| | | |
|---|---|---|
| 2045639 | 4/1971 | Fed. Rep. of Germany. |
| 2403679 | 8/1974 | Fed. Rep. of Germany ................... 137/614.11 |
| 2464025 | 4/1975 | Fed. Rep. of Germany. |
| 2352370 | 4/1975 | Fed. Rep. of Germany. |
| 2359717 | 6/1975 | Fed. Rep. of Germany. |
| 1050164 | 1/1954 | France. |

Primary Examiner—A. Rosenthal
Attorney, Agent, or Firm—Cushman, Darby & Cushman

[57] ABSTRACT

An attenuator valve assembly includes a closure member having one or more attenuator plates associated with it. The closure member have the form of a ball with a bore, a ball calotte, or a butterfly valve disc, etc. The attenuating effect of the attenuator plates are called into play immediately when the closure member is first opened, with the attenuating effect greatest during initial opening of the closure member and diminishing as the closure member is moved toward the completely open position. When the closure member is in the form of a valve disc or ball calotte, the attenuator plates are mounted for rotation with the closure member spaced from the closure member.

17 Claims, 18 Drawing Figures

ATTENUATING ROTATING VALVE HAVING VARYING CONFIGURATIONS

CROSS-REFERENCE TO RELATED APPLICATIONS

This application is a continuation-in-part of my application Ser. No. 103,182 filed Dec. 11, 1979.

BACKGROUND OF THE INVENTION

The present invention relates to a valve which has a closure member having a regular curved exterior surface, such as a ball, conical or cylindrical plug-like member, butterfly valve disc, or ball calotte, which operates to attenuate the flow of fluids or medium passing through the valve.

In the field of flow passages and the utilization of pipes to direct flow, valves have been utilized to distribute the pressure drop into several phases and to control and stop flow. In the prior art it is known that a closure member may be furnished with a punched plate-like attenuator device, which has been disposed in a transverse position with regard to the longitudinal direction of the flow passage past the closure member. Such prior art attenuator devices are disadvantageous when the valve is fully open, because when the valve is fully open the attenuator device operates to restrict the flow capacity. On the other hand, if there is no attenuation or little attenuation, cavitation is produced in the valve, causing vibration, noise and wear, at high pressure ranges, especially where compressible fluids are employed.

SUMMARY OF THE INVENTION

The disadvantages and limitations of prior art valves having attenuators which are effective in attenuation but restrict the flow of fluid are obviated by valve assemblies employing attenuators in accordance with the present invention. The present attenuator valve assembly combines the advantages of a non-attenuator closure member by not restricting the flow when the valve is fully open while at the same time providing effective attenuation at all partially open positions with the degree of attenuation dependent upon the related pressure between the upstream and downstream portions of the valve. More particularly, the present invention provides for variable controlled attenuation which is achieved by the configuration of the valve assembly in cooperation with the disposition of perforated barrier means (an attenuator plate or like structure) associated with the closure member to vary the amount of attenuation relative to the amount of attenuation required by the degree to which the valve is opened.

The advantages of the present invention are achieved by disposing the attenuator structure in the bore of a closure member preferably in a position which is parallel to the longitudinal direction of the flow passage past the closure member. The attenuator device is mounted with the closure member and is designed to point substantially on a geometric extension of the curved exterior surface of the closure member to provide a variable attenuation.

The present invention produces an improved valve provided with an attenuator device which—when the valve is in fully open position—results in an attenuation whch negligibly affects the flow. The functioning of the valve remains similar to that of a non-attenuated valve of corresponding size in the fully open position, but when the pressure drop is great upstream (in comparison to downstream, such as where attenuation is required), the attenuation device effectively attenuates the flow in the variable control range of the valve.

The valve in accordance with the invention can attenuate in both flow directions and comprises perforated barrier means—such as at least one attenuator plate—firmly attached to the flow opening of the closure member. If more than one attenuator plate is employed, it is preferable to place them side-by-side and at a distance from each other, whereby the ends of said attenuator plate or plates protrude up to, or very close to, the surface level of the rotation pattern of the closure member. The attenuator plate or plates include holes or apertures passing through the plate which assist in the attenuating function of the plates.

The attenuator plates may be arranged in such a manner that they are immediately called into play when the valve is first opened, but after the valve has been opened a significant amount are no longer particularly active. This can be accomplished, where the closure member is a ball, by mounting the plates adjacent one side of the bore through the ball, the opposite side of the bore being free of plates. Where the closure member takes the form of a spherical segment, such as disc for a butterfly valve, or a ball calotte, an accessory structure is provided for mounting the plates so that they are spaced from the spherical segment, but extend to points substantially on a geometric extension of the curved exterior surface of the spherical segment. In the case of a disc closure member, the barrier means can be provided by plates extending parallel to the disc. In the case of a ball calotte closure member, the barrier means can be provided by plates extending parallel to the flow passageway when the valve is in the completely open position.

It is the primary object of the present invention to provide an attenuator valve assembly that will not substantially restrict flow when in the open position, but will effectively perform an attenuating function in a variable control range. This and other objects of the invention will become clear from an inspection of the detailed description of the invention, and from the appended claims.

DETAILED DESCRIPTION OF THE DRAWINGS

An exemplary attenuating valve assembly, and various embodiments thereof, are illustrated in the drawings. The valve assembly includes the conventional components of a valve body 11 having a flow passageway 14 formed therethrough; a closure member 12, preferably having a regular curved exterior surface 17, and in some embodiments having a single elongated bore 13 formed therethrough; and means for mounting the closure member 12 in the valve body 11 for rotation for about an axis A—A with respect to the valve body 11. The mounting means include the valve stem 19 (which preferably is one-piece with the member 12, especially when it is a ball), a conventional packing 20, and a conventional gland 21. The mounting means provide for rotation of the closure member 12 to and between an open position (see FIG. 3) wherein the bore 13 is substantially in line with the flow passageway 14, and a closed position (just past the position illustrated in FIG. 2) wherein the bore 13 is substantially perpendicular to the flow passageway 14. The closure member bore 13 has a predetermined height H (see FIG. 1) in the dimension of the closure member axis of rotation A—A, and a predetermined length L in the dimension of elongation thereof. The valve assembly further conventionally comprises sealing means 15 provided in the valve body 11 flow passageway 14 for operatively engaging the closure member curved exterior surface 17, and preventing fluid passage through the flow passageway 14 from one end thereof to the other except through the closure member bore 13.

Figures 1, 2, 3, 4A, 4B:
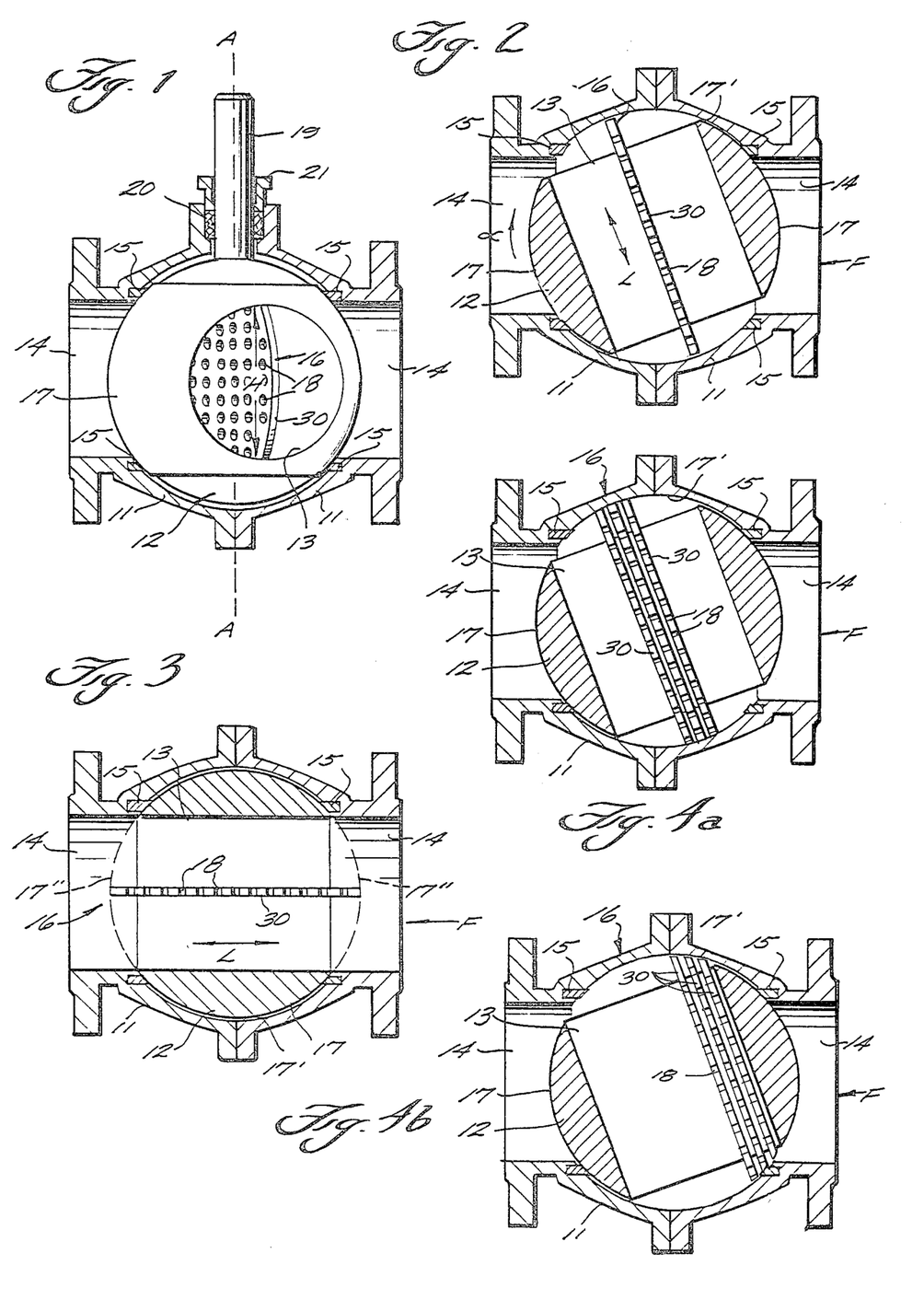
FIG. 1 is a side view showing an exemplary ball valve assembly according to the present invention with the valve housing in cross-section and with the ball closure member in elevation.
FIG. 2 is a longitudinal sectional view of the valve assembly of FIG. 1 taken at the center of the flow passage as seen from the valve stem, and in which the closure member is in a variable control range approaching a fully closed position.
FIG. 3 illustrates the valve assembly of FIG. 2 wherein the closure member is in an open position.
FIGS. 4a, 4b, 5, 6, and 7 are longitudinal views of alternative embodiments of the valve assembly according to the present invention.
Figure 9:
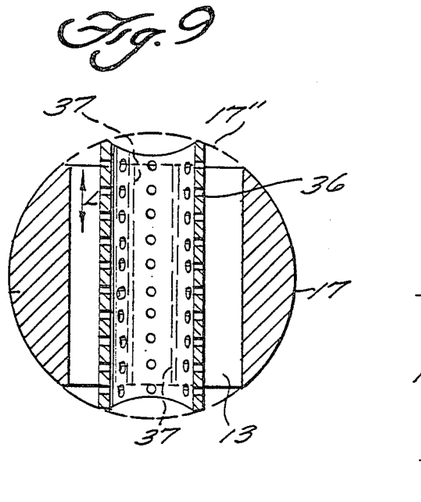
FIG. 9 is a longitudinal sectional view taken along lines B—B of FIG. 8.
Figure 10:
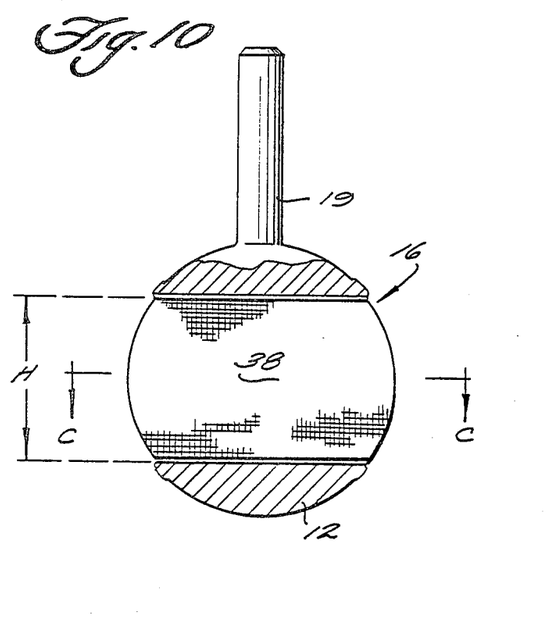
FIG. 10 is a sectional view of yet another embodiment of a ball element according to the present invention, the section being taken along a plane parallel to the stem and illustrating an attenuator device in elevation.
Figure 11:
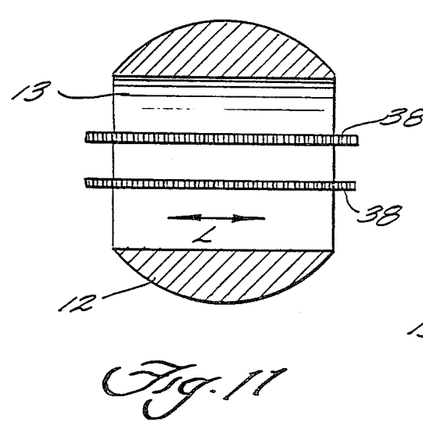
FIGS. 11 and 12 are longitudinal sectional views of two different modifications of the embodiment of FIG. 10.
Figure 12:
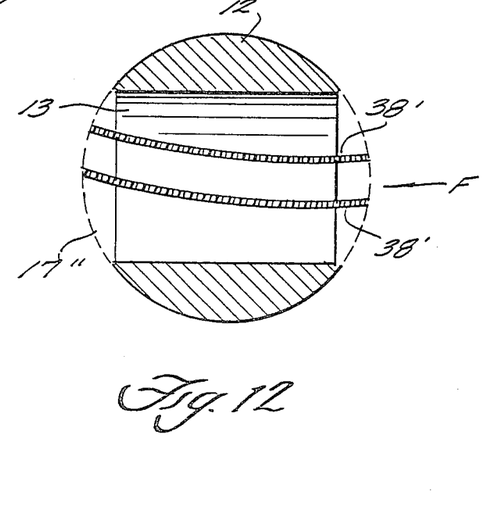

According to the present invention, means for attenuating fluid flowing past the closure member 12 without substantialy restricting flow when the closure member is in the open position (e.g., see FIGS. 3 and 15) are provided, and indicated generally at 16 in the drawings. The attenuating means comprise barrier means having perforations 18 formed therein. In the embodiments illustrated in FIGS. 1-12, the barrier means are mounted in the closure member bore 13, said means preferably having at least one surface substantially parallel to the dimension of elongation L of the bore 13 and extending substantially entirely the bore predetermined height H, and extending outwardly from either side of the bore 13 to points substantially one a geometric extension 17" of the curved exterior surface of the closure member. Such a geometric extension 17" is illustrated most clearly in FIGS. 3, 7, and 9. With the barrier means arranged in such a manner, there is sufficient clearance between the barrier means and portions which extend outwardly of the bore 13 and the cooperating interior curved surface 17' of the valve body 11 so that rotation between the fully open and fully closed positions is allowed, however the clearance is small enough that the barrier means very effectively performs its attenuating function in its variable control range (such as illustrated in FIG. 2).

Figure 15:
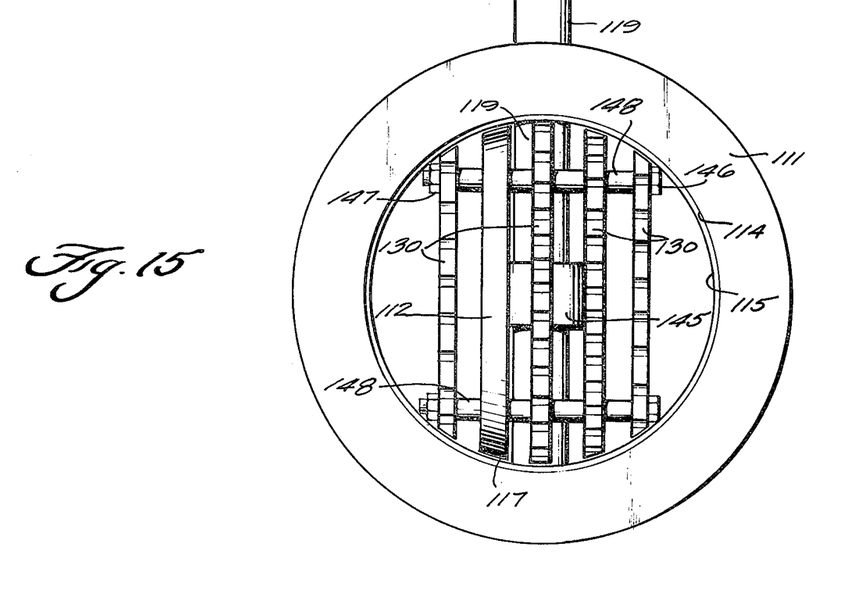
FIG. 15 is an end view of the valve of FIGS. 13 and 14 with the valve in the open position.
Figure 16:
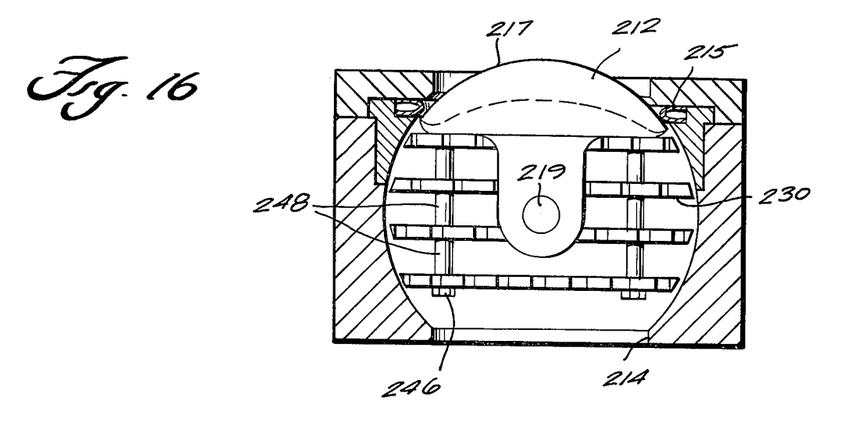
FIG. 16 is a longitudinal view, partly in cross-section and partly in elevation, of another embodiment of the valve assembly according to the present invetnion, wherein the closure member is in the form of a ball calotte, and showing the valve in the completely closed position.
Figure 17:
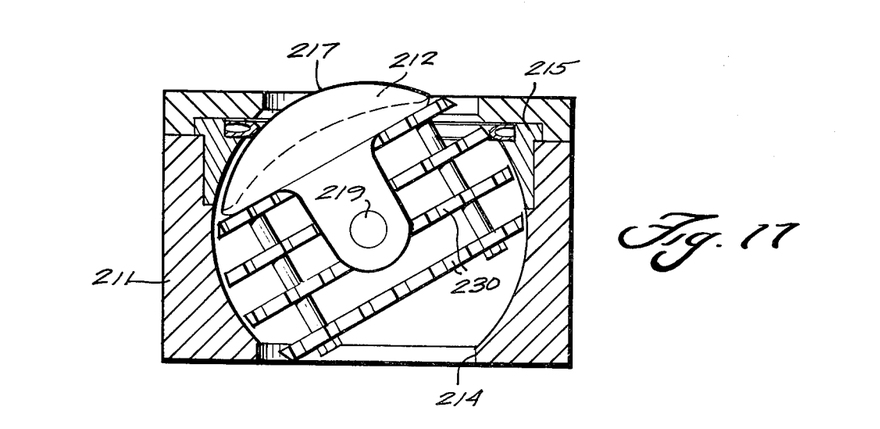
FIG. 17 is a view like FIG. 16 only showing the valve in a partly open position.

The closure member 12 may take a wide variety of forms, such as the conventional ball closure member illustrated in FIGS. 1-12, conical plug-like closure members, cylindrical plug-like closure members, butterfly valve discs (FIGS. 13-15), or ball calottes (FIGS. 16 and 17). The closure member 12 preferably has a regular curved exterior surface—e.g., in the case of a butterfly valve disc the disc is a segment of a sphere.

The bore 13 in ball embodiment of the closure member 12 may have a wide variety of configurations, although preferably it is circular in cross-section, and of constant diameter. In the embodiment of the invention illustrated in FIG. 5 (which is especially suited for high pressure environments) the bore 13' does not have a constant diameter, but rather is tapered so it is narrower on the upstream side of the closure member 12 than on the downstream side. Other bore configurations also are utilizable.

While certain configurations are preferred and have advantages, especially for particular environments, in general the attenuating barrier means 16 may comprise any type of perforated surface capable of performing the desired attenuating function. One form that the barrier means 16 may desirable take is that of a single plate 30, as illustrated in FIGS. 1 through 3. The plate 30 engages both the bottom and the top of the bore 13, thus spanning the entire height H of the bore 13, and extends parallel to the dimension of elongation L of the bore 13. As illustrated most clearly in FIG. 3, the ends of the plate 30 extend outwardly from the closure member 12 to substantially the geometric extension 17" of the curved exterior surface 17 of the closure member. By constructing the attenuating means 16 in this manner, it will be seen that in the fully opened position of the valve, as illustrated in FIG. 3, the plate 30 does not significantly restrict the fluid flow through the passage 14 in bore 13, however in variable control positions of the closure member 12—as illustrated in FIG. 2—the plate 30 very effectively performs an attenuating function since fluid must flow through the perforations 18 therein in order to pass from one end of the fluid passageway 14 to the other, the construction of the plate 30 relative to the rest of the assembly components preventing passageway of any substantial amount of fluid around the plate 30.

In the embodiment illustrated in FIGS. 4a and 4b three plates 30 are provided. In situations where more than one attenuating surface is utilized, such as the plurality of plates 30 in the FIG. 4a embodiment, preferably the perforations (holes or apertures) 18 of adjacent surfaces are not in alignment. For instance in FIG. 4a, the perforations 18 in the two outer plates are not in alignment with the perforations in the center plate. Where a plurality of attenuating surfaces are utilized with compressible mediums, it is preferred that the perforations 18 in the attenuating surfaces closest to the upstream portion of the closure member have the least aperture area in relation to the total area of the attenuating surface, and that the perforation area of each successive attenuator surface increases in the flow direction. For instance in the FIG. 4a embodiment it would be advantageous to increase the size of the perforations 18 from plate 30 to plate 30 in the direction of fluid flow indicated by the arrow F.

In the FIG. 4b embodiment, the plates 30 are mounted so that they immediately effect attenuation as the closure member 12 is moved from the closed to the open position, with the attenuating effect being greatest during initial opening (or just prior to closing), and diminishing as the closure member 12 is rotated toward the completely open position (increasing as it is rotated toward the completely closed position). The plates 30 in FIG. 4b are mounted by portions of the ball 12 defining the bore 13 adjacent one side of the bore, with the opposite side of the bore 13 being free of plates.

Figure 5:
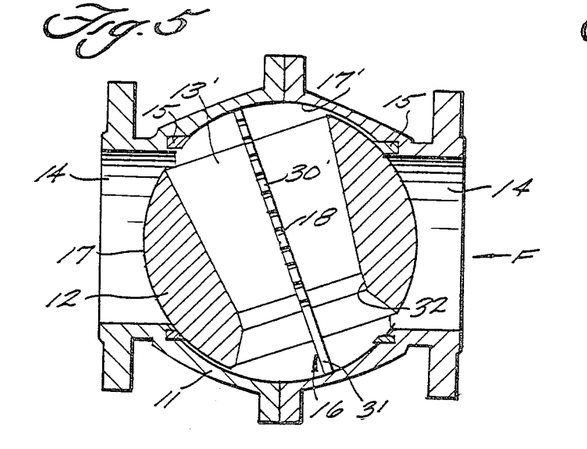

In the FIG. 5 embodiment, which as previously indicated is most useful involving high pressure compressible mediums, a plate 30' is provided that is slightly different from the plates 20 illustrated in the FIGS. 1 through 4a embodiments. For the plate 30', an upstream end 31 thereof is provided that is free of perforations 18, the perforations only being provided downstream of the smallest cross-sectional portion 32 of the bore 13'.

Figure 6:
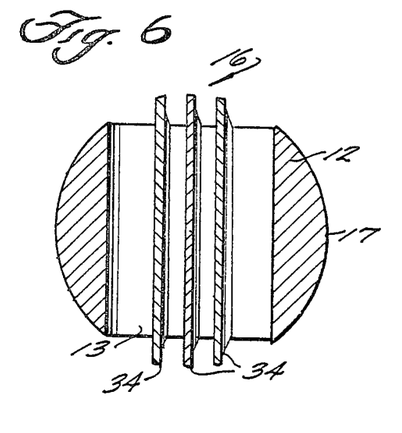
Figure 7:
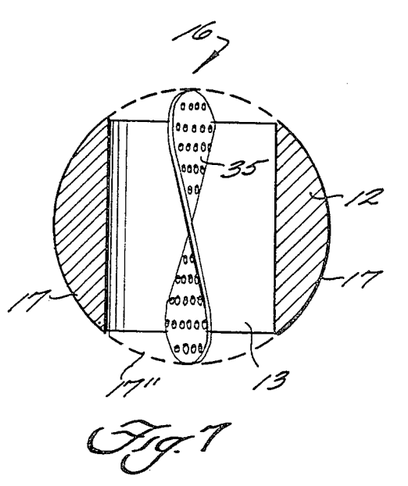
Figure 8:
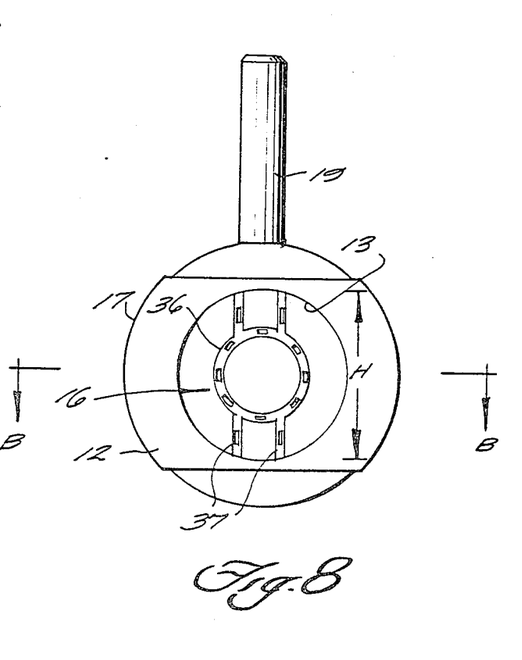
FIG. 8 is an end view of still another modified form of the ball closure element utilizable in the valve assembly according to the invention.

In the embodiment according to the invention illustrated in FIG. 6, the attenuating barrier means 16 comprise a plurality of perforated structures 34 that are in the form of curved cylinder portions. In the FIG. 7 embodiment, the perforated barrier means 16 comprises a structure 35 essentially consisting of a perforated plate twisted into a spiral configuration. In the embodiment illustrated in FIGS. 8 and 9, the barrier means 16 includes a tubular structure 36 concentric with and substantially smaller than the bore 13, and preferably supported at the top and bottom thereof by one or more perforated plates 37. Both the tube 36 and the plates 37 are substantially parallel to the dimension of elongation L of the bore 13.

The exact nature of the perforations or apertures formed in the barrier means 16 may also take a wide variety of forms. In the embodiments illustrated in FIGS. 10 through 12, the barrier means 16 comprise one or more screens 38, 38'. The screens 38 are planar, while the screens 38' are curved in the direction of flow F.

An exemplary manner of construction and method of operation of the valve assembly according to the present invention will now be described with particular reference to the FIGS. 1 through 3 embodiment. An integral one piece ball 12 and stem 19 closure member is constructed, having a circular cross-section constant diameter bore 13 formed therein and a curved regular exterior surface 17. The ball 12 and stem 19 are mounted in a conventional valve housing 11 having sealing rings comprising sealing means 15 which engage the curved exterior surface 17 of the ball 12 to prevent fluid flow through the valve housing 11 passageway 14 except through the bore 13, and a conventional packing 20 and gland 21 are provided for receiving the stem 19. A perforated plate 30 is welded, braized, soldered, glued, or otherwise attached to the interior surface of the ball 12 defining the bore 13, so that the plate 30 extends substantially parallel to the dimension of elongation L of the bore 13, and spans substantially the entire height H of the bore 13, ends of the plate 30 extending outwardly from either side of the bore 13 to points substantially on the geometric extension 17" of the curved exterior surface 17 of the ball 12.

When it is desired to allow the flow of fluid from one end of the passageway 14 to the other, the stem is rotated so that the bore 13 is substantially in-line with the flow passageway 14, as illustrated in FIG. 3. In this position, the plate 30 does not significantly restrict fluid flow in direction F, or in the opposite direction (if provided). When it is desired to close the valve, the ball 12 is rotated about the axis A—A by rotation of the stem 19 in direction α—see FIG. 2—during which rotation the plate 30 extends so that more and more surface area thereof progressively comes in contact with fluid flowing in the direction F, until finally the leading edge of the plate 30 passes the sealing ring 15, while the trailing edge thereof passes the opposite sealing ring 15, at which point—and until the ball 12 is in its fully closed position with the bore 13 perpendicular to the direction of flow F—fluid flowing through the bore 13 must pass through the attenuator plate 30, and thus is attenuated.

Figure 13:
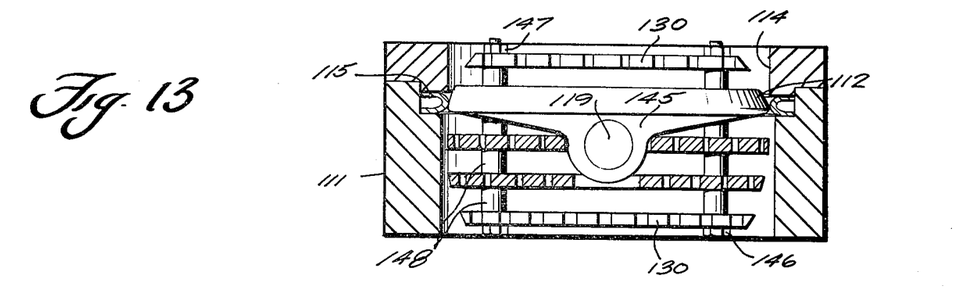
FIG. 13 is a longitudinal view, partly in cross-section and partly in elevation, of another embodiment of the valve assembly according to the present invention, wherein the closure memeber is in the form of a butterfly valve disc, and showing the valve in the completely closed position.
Figure 14:
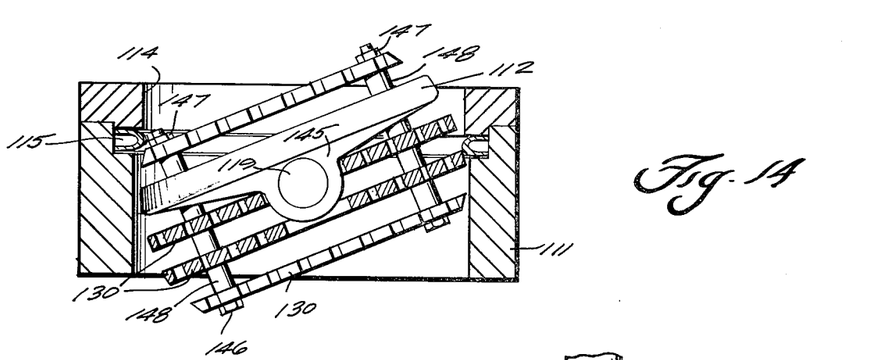
FIG. 14 is a view like FIG. 13 only showing the valve in a partly open position.

In the embodiments of the invention illustrated in FIGS. 13 through 17—like the embodiment illustrated in FIG. 4b—the attenuating effect is called into play immediately upon the movement of the closure member from the closed to the open position, with the attenuating effect being greatest during initial opening (or just prior to closing) and diminishing as the closure member is rotated toward the completely open position (increasing as it is rotated toward the completely closed position). In the embodiment illustrated in FIGS. 13 through 15, the closure member 112 is illustrated as a butterfly valve disc (particularly a spherical segment), while in the embodiment illustrated in FIGS. 16 and 17, the closure member 212 is in the form of a ball calotte. In FIGS. 13 through 15, like elements are referred to by reference numerals corresponding to the elements illustrated in FIGS. 1 through 12 only with a "1" preceding the reference numeral, while in FIGS. 16 and 17 like reference numerals are preceded by a "2".

In both the embodiments of FIGS. 13 through 15, and 16 and 17, one or both sides of the closure member 112, 212 are fitted with attenuator plates 130. Such valve assemblies produce attenuated flow in valves having a closure member without a bore through which fluid flows. As illustrated in the drawings, preferably the plates 130, 230, extend to points substantially on a geometric extension of the curved exterior surface 117, 217 of the closure member 112, 212, respectively.

In the FIGS. 13 through 15 embodiment, the valve disc 112 is mounted for rotation by shaft 119 with respect to housing 111, bearings (not shown) being provided for allowing rotation of shaft 119 with respect to housing 111. The valve disc 112 is connected to the shaft 119 with a collar 145 or the like. The attenuating plates, which preferably are planar and are parallel to the flow passage 114 in the open position of the valve (FIG. 15), and parallel to the disc 112 faces, and to each other, may be mounted as illustrated in FIGS. 13 through 15 with one or more plates in front of the disc 112, and one or more plates behind the disc 112. The size of the perforations in the plates 130 may vary as indicated in FIGS. 13 and 14. Mounting may be accomplished utilizing a plurality of fasteners such as fastening bolts 146 which pass through openings in the plates 130 and openings in the disc 112. Nuts 147 may secure the bolts in place, and spacers or bushings 148 are provided for spacing the attenuators 130 from each other and from the disc 112.

While it is normally preferred that the plates 130 be parallel to the faces of the disc 112, and parallel to the bore 114 in the open position, the plates may be mounted so that geometrical projections thereof intersect each and/or the disc faces, they are curved, etc., as more fully described above with respect to the FIGS. 1 through 12 embodiments. The term "attenuator plate" as used with respect to the structures 130 is considered in its broadest sense, and may include screens, nets, etc., as more fully described above with respect to the FIGS. 1 through 12 embodiments.

In the FIGS. 16 and 17 embodiment, the closure member 212 comprises a ball calotte, with the rest of the structures illustrated in FIGS. 16 and 17 being comparable to the similarly numbered components in the embodiment of FIGS. 13 through 15. Note that in the embodiment illustrated in the drawings, the fastening bolts 246 penetrate the calotte 212 and may be received by screw-threaded openings formed therein.

For both the FIGS. 13 through 15, and 16 and 17 embodiments, the closure members 112, 212 may take any conventional form. For instance, the butterfly valve disc 112 may take the form of such as illustrated in U.S. Pat. Nos. 4,037,819, 3,583,668, or 4,058,290, the disclosures of which are hereby incorporated by reference herein.

It will thus be seen that according to the present invention a simple yet effective attenuator valve assembly is provided. The attenuator valve assembly is capable of attenuating fluid flow during opening and closing, but offers little resistance to the fluid flow when in the completely open position. Further, the attenuator valve assembly according to the present invention is capable of immediately attenuating the flow upon initial movement of the closure member from the closed position and providing an attenuating effect that is great during initial opening and diminishing as the closure member moves toward the completely open position.

While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An attenuator valve assembly comprising: a valve body having a flow passage formed therethrough; a closure member comprising a butterfly valve disc; means for mounting said closure member in said valve body for rotation about an axis with respect to said valve body between a completely open position wherein said closure member allows passage of fluid therepast through said flow passage, and a completely closed position wherein said closure member blocks all flow through said flow passage; sealing means provided in said valve body flow passage for operatively engaging said closure member for preventing fluid flow through said flow passage past said closure member when said closure member is in said closed position; means for attenuating fluid flowing through said flow passage past said closure member, without significantly restricting flow when said closure member is in said completely open position, said means comprising perforated barrier means comprising a plurality of perforated plates mounted with said closure member and spaced from each other in the direction of the flow passage when said closure member is in said closed position; and means for mounting said perforated plates with respect to said closure member so that the attenuating effect of said perforated plates is immediately called into play when said closure member is first opened and the attenuating effect thereof is great during initial opening of said closure member, and diminishes as said closure member is moved toward said completely open position, said mounting means including a plurality of fasteners extending perpendicular to the face of said valve disc, with said plates mounted at spaced positions along said fasteners.

2. An attenuator valve assembly comprising: a valve body having a flow passage formed therethrough; a closure member; means for mounting said closure member in said valve body for rotation about an axis with respect to said valve body between a completely open position wherein said closure member allows passage of fluid therepast through said flow passage, and a completely closed position wherein said closure member blocks all flow through said flow passage; sealing means provided in said valve body flow passage for operatively engaging said closure member for preventing fluid flow through said flow passage past said closure member when said closure member is in said closed position; means for attenuating fluid flowing through said flow passage past said closure member, without significantly restricting flow when said closure member is in said completely open position, said means comprising perforated barrier means mounted with said closure member, said perforated barrier means including continuously open through-extending perforations and comprising a plurality of perforated plates; and means for mounting said perforated plates adjacent said closure member substantially within said valve body for rotation about said axis, and spaced from each other in the direction of said flow passage when said closure member is in said closed position so that the attenuating effect of said plates is immediately called into play when said closure member is first opened and the attenuating effect thereof is great during initial opening of said closure member, and diminishes as said closure member is moved toward said completely open position.

3. An assembly as recited in claim 2 wherein said closure member comprises a butterfly valve disc, and said plates are planar, and wherein said plate mounting means mount said plates so that they extend generally parallel to said disc.

4. An assembly as recited in claim 2 wherein said closure member comprises a butterfly valve disc having opposed faces, and wherein said plate mounting means mount said plates so that at least one plate is disposed in association with either face of said butterfly disc.

5. An assembly as recited in claim 2 wherein said closure member comprises a ball calotte, and wherein said plates are planar, and wherein said plate mounting means mount said plates so that they all extend generally parallel to said flow passage when said valve is in said open position.

6. An assembly as recited in claim 2 wherien said closure member comprises a ball calotte, and wherein said plate mounting means include a plurality of fasteners extending perpendicular to the axis of rotation of said ball calotte, penetrating a portion thereof, with said plates mounted at spaced positions along said fasteners.

7. An assembly as recited in claim 2 wherein said closure member comprises a ball having a bore therein, and wherein said plate mounting means comprise portions of said ball defining said bore so that said plates are mounted within said bore adjacent one side of the bore, with the opposite side of the bore being free of plates.

8. A valve assembly comprising a valve body having a flow passage formed therethrough; a closure member having a regular spherical section curved exterior surface; means for mounting said closure member in said valve body for rotation about an axis with respect to said valve body between open and closed positions, said closure member blocking flow through said flow passage in said closed position; sealing means provided in said valve body flow passage for operatively engaging said closure member for preventing fluid passage through said flow passage past said closure member when said closure member is in said closed position; a plurality of attenuator plates each said plates including continuously open through-extending perforations; and means for mounting said plates for rotation with said closure member about said axis, and spaced from, but adjacent, said closure member to effect attenuation of fluid flowing through said flow passage as said closure member is being moved from said closed to said open position thereof, and vice-versa, and so that said plates are spaced from each other and are generally parallel to each other, and each extends to points substantially on a geometric extension of said regular spherical section curved exterior surface to engage said sealing means to provide that fluid flowing in said flow passage past said closure member, in a partially open position thereof, flows through said plates; and wherein said plurality of attenuator plates are spaced from each other in the direction of said flow passage when said closure member is in said closed position.

9. An assembly as recited in claim 8 wherein said closure member comprises a butterfly valve disc, and said plates are planar, and wherein said plate mounting means mount said plates so that they extend generally parallel to said disc.

10. An assembly as recited in claim 8 wherein said closure member comprises a butterfly valve disc having opposed faces, and wherein said plate mounting means mount said plates so that at least one plate is disposed in association with either face of said butterfly disc.

11. An assembly as recited in claim 8 wherein said closure member comprises a ball calotte, and wherein said plates are planar, and wherein said plate mounting means mount said plates so that they all extend generally parallel to said flow passage when said valve is in said open position.

12. An assembly as recited in claim 8 wherien said closure member comprises a ball calotte, and wherein said plate mounting means include a plurality of fasteners extending perpendicular to the axis of rotation of said ball calotte, penetrating a portion thereof, with said plates mounted at spaced positions along said fasteners.

13. An attenuator valve assembly comprising: a valve body having a flow passage formed therethrough; a closure member comprising a butterfly valve disc; means for mounting said closure member in said valve body for rotation about an axis with respect to said valve body between a completely open position wherein said closure member allows passage of fluid therepast through said flow passage, and a completely closed position wherein said closure member blocks all flow through said flow passage, said axis defined by a solid shaft; sealing means provided in said valve body flow passage for operatively engaging said closure member for preventing fluid flow through said flow passage past said closure member when said closure member is in said closed position; means for attenuating fluid flowing through said flow passage past said closure member, without significantly restricting flow when said closure member is in said completely open position, said means comprising perforated barrier means mounted with said closure member, said perforated barrier means including a plurality of perforated plates each having a pair of opposed faces and continuously open through-extending perforations said perforations extending through said plates from one face to the other in a direction essentially parallel to said flow passage when said closure member is in said closed position; and means for mounting said plates adjacent said closure member substantially within said valve body for rotation about said axis with both faces directly located in the flow of fluid in said flow passage, so that the attenuating effect of said plates is immediately called into play when said closure member is first opened and the attenuating effect thereof is great during initial opening of said closure member, and diminishes as said closure member is moved toward said completely open position said plate mounting means including a plurality of fasteners extending perpendicular to the face of said valve disc, with said plates mounted at spaced positions along said fasteners; and wherein said closure member has a regular spherical section curved exterior surface, and wherein said plates extend to points substantially on a geometric extension of said regular spherical section curved exterior surface to engage said sealing means to provide that fluid flowing in said flow passage past said closure member, in a partially open position thereof, flows through said perforations in said plates means.

14. A valve assembly comprising a valve body having a flow passage formed therethrough; a closure member; means for mounting said closure member in said valve body for rotation about an axis with respect to said valve body between open and closed positions, said closure member blocking flow through said flow passage in said closed position; sealing means provided in said valve body flow passage for operatively engaging said closure member for preventing fluid passage through said flow passage past said closure member when said closure member is in said closed position; a plurality of substantially circular attenuator plates, said plates each including continuously open through-extending perforations; and plate mounting means for mounting said attenuator plates for rotation with said closure member about said axis, and so that said plates are parallel to and spaced from each other and spaced from said closure member, said attenuator plates each being concentric with said closure member, and each plate spaced from, but adjacent, said closure member to effect attenuation of fluid flowing through said flow passage as said closure member is being moved from said closed to said open position thereof, and vice-versa.

15. An assembly as recited in claim 14 wherein said closure member comprises a butterfly valve disc, and said plates are planar, and wherein said plate mounting means mount said plates so that they extend generally parallel to said disc.

16. An assembly as recited in claim 14 wherein said closure member comprises a butterfly valve disc, and wherein said plate mounting means mount said plates so that at least one plate is disposed on either side of said butterfly disc.

17. An assembly as recited in claim 14 wherien said closure member comprises a ball calotte, and wherein said plate mounting means include a plurality of fasteners extending perpendicular to the axis of rotation of said ball calotte, penetrating a portion thereof, with said plates mounted at spaced positions along said fasteners.

* * * * *